Dec. 29, 1953  E. J. DE NORMANVILLE  2,664,016
EPICYCLIC POWER TRANSMISSION MECHANISMS
Filed July 24, 1952
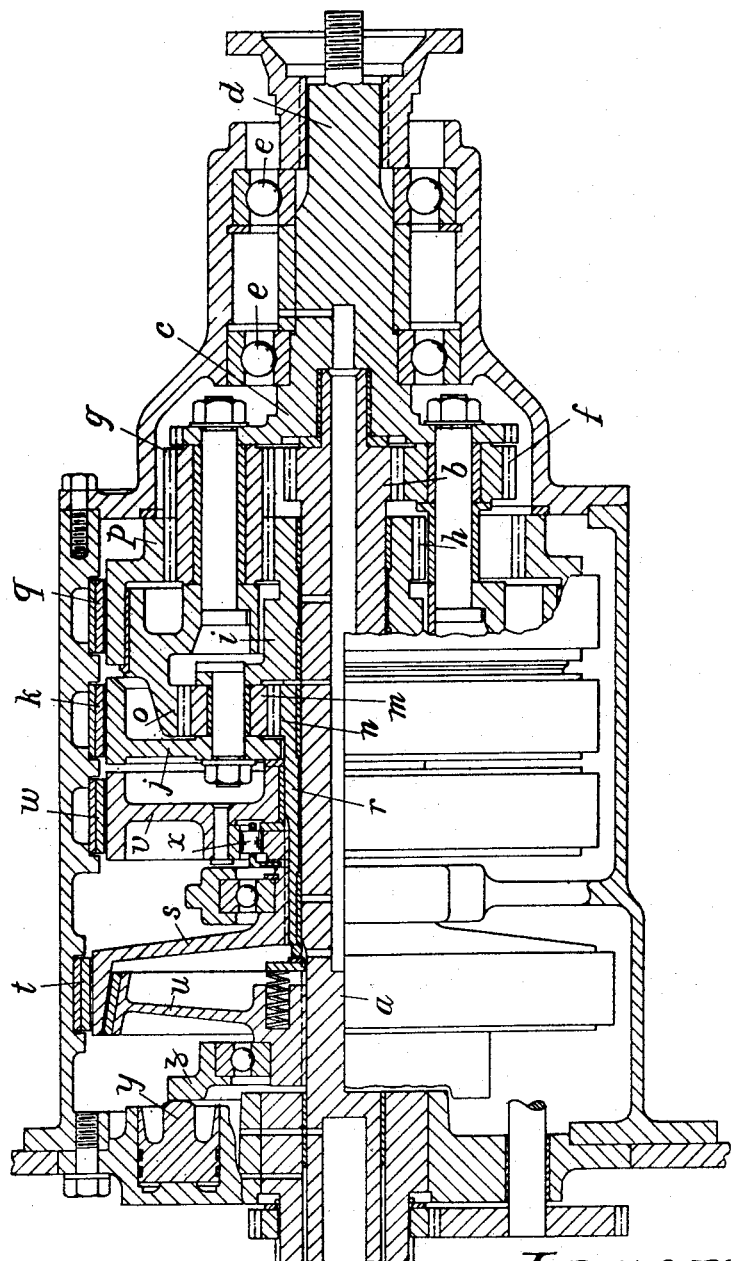
Inventor
E. J. de Normanville Patented Dec. 29, 1953

2,664,016

UNITED STATES PATENT OFFICE 2,664,016

EPICYCLIC POWER TRANSMISSION MECHANISMS

Edgar Joseph de Normanville, Ashridge Park, Berkhampstead, England, assignor of one-half to Auto Transmissions Limited, Coventry, England Application July 24, 1952, Serial No. 300,631

Claims priority, application Great Britain August 2, 1951

2 Claims. (Cl. 74—759)

This invention relates to epicyclic power transmission mechanisms for use more particularly on mechanically propelled vehicles.

The invention comprises the combination of an input shaft, a driving sun pinion on the said shaft, a reaction sun pinion freely mounted on the said shaft, a planet pinion carrier serving as the driven member, interengaging planet pinions on the said carrier respectively engaging the driving and reaction sun pinions, a brake-controllable internally toothed annulus engaging the planet pinions which engage the reaction sun pinion, an internally toothed annulus on the said planet pinion carrier, a second planet pinion carrier associated with the reaction sun pinion, a brake-controllable member on the second planet pinion carrier, a second reaction sun pinion freely mounted on the input shaft, planet pinions on the second carrier engaging the second reaction sun pinion and the annulus of the first planet pinion carrier, a brake-controllable clutch member associated with the second reaction sun pinion, and a complementary clutch member on the input shaft.

The accompanying drawing is a sectional side elevation of a mechanism embodying the invention.

Referring to the drawing, the input shaft $a$ of the mechanism has formed on or secured to it the driving sun pinion $b$. On this shaft is mounted a planet pinion carrier $c$ (hereinafter referred to as the first planet pinion carrier) which constitutes the driven member and may be formed on or secured to a driven shaft $d$ which is supported in appropriate bearings $e$ and which itself supports the adjacent end of the input shaft.

On the said planet pinion carrier $c$ are mounted interengaging planet pinions $f$, $g$ which respectively engage the driving sun pinion and a reaction sun pinion $h$, the latter being formed on or secured to a second planet-pinion carrier $i$ mounted on the input shaft. The second planet pinion carrier has combined with it a member $j$ controllable by a brake $k$ and on it are mounted other planet pinions $m$ which engage a second reaction sun pinion $n$ and an internally toothed annulus $o$ on the first planet pinion carrier. Further there is provided an internally toothed annulus $p$ engaging those pinions $g$ on the first planet pinion carrier which engage the first mentioned reaction sun pinion $h$, the annulus $p$ being controlled by a brake $q$.

The second reaction sun pinion $n$ is formed on or secured to a sleeve $r$ carried by the input shaft, which sleeve has formed on or secured to it a friction clutch member $s$ controllable by a brake $t$ and engageable with a complementary clutch member $u$ secured to the input shaft.

If desired a unidirectional clutch may be combined with one of the reaction sun pinions. In the arrangement shown in the drawing it is combined with the second reaction sun pinion $n$ and comprises a member $v$ controllable by a brake $w$ and engageable with the sleeve $r$ through rollers $x$, the surfaces with which the rollers interact being adapted to interlock the parts $v$, $r$ in one direction of rotation.

With the arrangement shown, the first speed is obtained by holding the second planet pinion carrier $j$. Second speed can be obtained by holding the clutch member $s$ associated with the second reaction sun pinion but normally this speed would be obtained by holding the member $v$ by the brake $w$. The member $s$ is held by the associated brake $t$ to give the second speed when it is required to utilize the braking action of the engine during deceleration of the vehicle. The top speed is obtained by engagement of the said clutch member $s$ with the clutch member $u$ on the input shaft, this being effected in the example shown, by axial movement of the member $u$ by a fluid operated plunger $y$ acting on a part $z$ carried by the member $u$. Reversal of motion of the driven member is obtained by holding the annulus $p$ which engages the planet pinions associated with the first reaction sun pinion.

By the above described arrangement a desirable range of speed changes with ease of control can be provided in a very convenient form.

Having thus described my invention what I claim as new and desire to secure by Letters Patent is:

1. An epicyclic power transmission mechanism comprising the combination of an input shaft, a driving sun pinion on the said shaft, a reaction sun pinion freely mounted on the said shaft, a planet pinion carrier serving as the driven member, interengaging planet pinions on the said carrier respectively engaging the driving and reaction sun pinions, a brake-controllable internally toothed annulus engaging the planet pinions which engage the reaction sun pinion, an internally toothed annulus on the said planet pinion carrier, a second planet pinion carrier associated with the reaction sun pinion, a brake-controllable member on the second planet pinion carrier, a second reaction sun pinion freely mounted on the input shaft, planet pinions on the second carrier engaging the second reaction sun pinion and the annulus of the first planet pinion carrier, a brake-controllable clutch member associated with the second reaction sun pinion, and a complementary clutch member on the input shaft.

2. A mechanism as claimed in claim 1 having combined with one of the reaction sun pinions a brake-controllable member in unidirectional clutch connection with the said pinion.

EDGAR JOSEPH DE NORMANVILLE.

References Cited in the file of this patent

FOREIGN PATENTS

| Number | Country | Date |
|---|---|---|
| 141,492 | Great Britain | Apr. 22, 1920 |
| 630,508 | Great Britain | Oct. 14, 1949 |